Aug. 1, 1961  C. O. BAPTISTA  2,994,247
STRIP FILM PROJECTION APPARATUS
Filed June 15, 1959  2 Sheets-Sheet 1

Aug. 1, 1961     C. O. BAPTISTA     2,994,247
STRIP FILM PROJECTION APPARATUS

Filed June 15, 1959     2 Sheets-Sheet 2

2,994,247
STRIP FILM PROJECTION APPARATUS
Charles O. Baptista, 434 Sunnyside Ave.,
Du Page County, Wheaton, Ill.
Filed June 15, 1959, Ser. No. 820,447
2 Claims. (Cl. 88—28)

The invention relates to improvements in strip film projection apparatus and particularly is directed to a novel combination and arrangement of the film strip advancing sprocket.

It is an object of the invention to provide the film advancing sprocket with a very simple and effective solenoid controlled escapement which permits a step by step advancement of the film advancing sprocket.

Another object of the invention is to provide the film advancing sprocket with a coaxially arranged mechanism which permits a relative adjustment of the entire film advancing sprocket mechanism relative to the film gate of the projecting apparatus.

The drawings illustrate by way of example a preferred embodiment of the invention.

Figure 1:
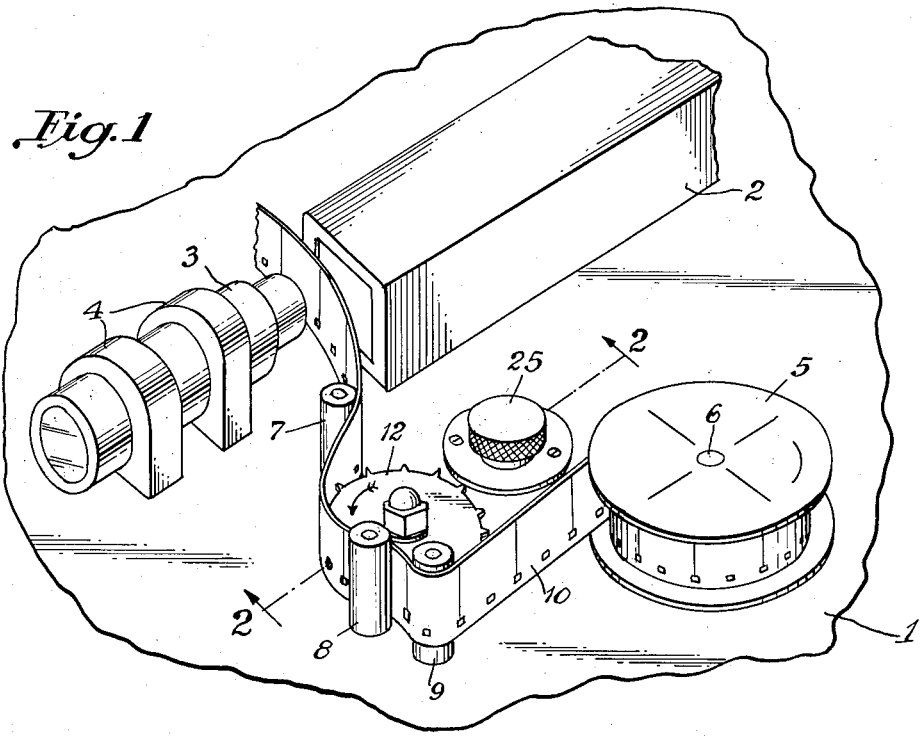
FIG. 1 illustrates a portion of the top perspective view of the strip film projection apparatus.

Referring to the drawings, FIG. 1 indicates a horizontally disposed base plate 1 on the upper face of which is mounted a lamp housing 2, a projection objective 3 which is adjustable in a support 4 fixed or integrally formed with the base plate, a film take up reel 5 on a rotatable shaft 6, guide roller 7, 8 and 9 for the film strip 10 and a film advancing sprocket 12. The film strip 10 is unwound from a film supply reel (not shown) and is moved through a conventional film gate (not shown) arranged between the lamp housing 2 and the projection objective 3.

Figure 2:
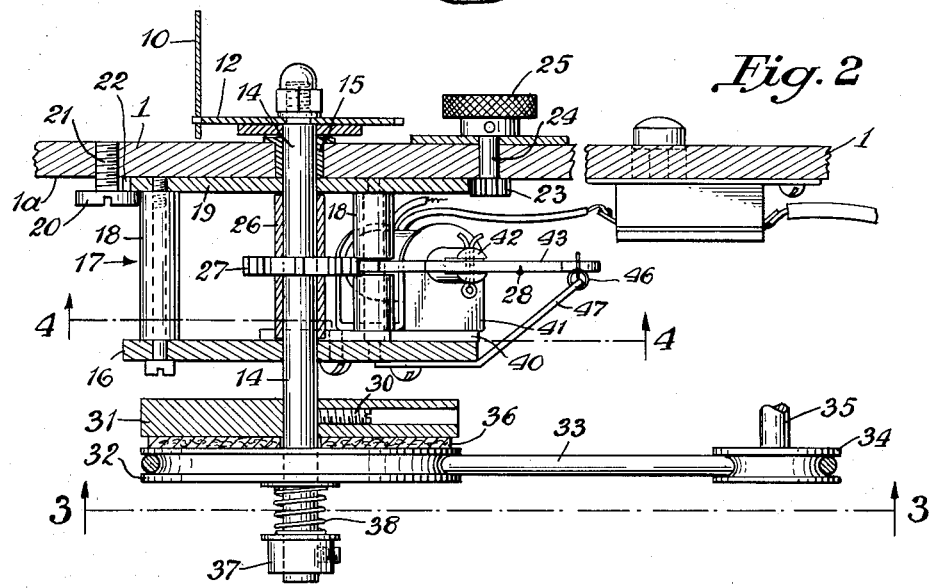
FIG. 2 is a vertical sectional view of the film strip advancing sprocket mechanism substantially along the line 2—2 of FIG. 1.

As particularly shown in FIG. 2, the film advancing sprocket 12 is fixedly attached to the upper end of a shaft 14 rotatably supported in a bearing bushing 15 mounted in the base plate 1 and in the lower plate 16 of a framing cage 17, the upper plate 19 of which is spaced from the lower plate 16 by a number of spacing rods 18. The upper plate 19 has the shape of a gear and loosely engages the lower face 1a of the base plate 1 and being held in engagement therewith by the flat heads 20 of a number of screws 21 which are screwed into the base plate 1. The gear teeth 22 of the plate 19 are engaged by a pinion 23 on the lower end of a shaft 24 passing through the base plate 1 and having at its upper end a knurled knob 25 permitting a manual rotation of the pinion 23 and therewith causing a rotation of the entire framing cage 17 and the sprocket 12 relatively to the film gate or picture window of the film projecting apparatus.

The shaft 14 has fixedly attached thereto within said framing cage 17 a sleeve 26 and on this sleeve 26 is fixedly mounted a ratchet wheel 27 which is adapted to be rotated step by step under the control of a solenoid controlled escapement lever 28 presently to be described in more detail.

The lower end of the shaft 14 extends below the framing cage 17 and has fixedly secured thereto, for instance by a set screw 30, a circular disc 31 of uniform thickness. Loosely mounted on the shaft 14 below the disc 31 is another disc 32 constructed as a pulley which is continuously driven by an endless belt 33 which in turn is driven by a drive pulley 34 on the armature shaft 35 of an electric motor (not shown). A felt disc 36 is placed between the discs 31 and 32 and the disc 32 is constantly urged toward the disc 31 by a helical spring 38 mounted on the shaft 14 between the disc 32 and a collar 37 fixed on the shaft 14.

Figure 3:
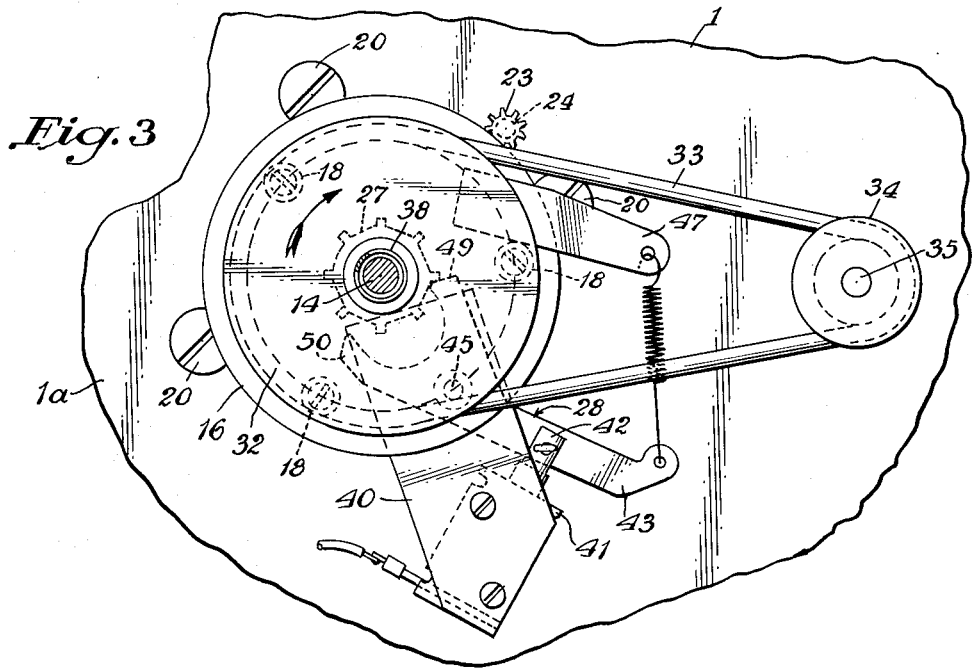
FIG. 3 is a horizontal sectional view along the line 3—3 of FIG. 2.
Figure 4:
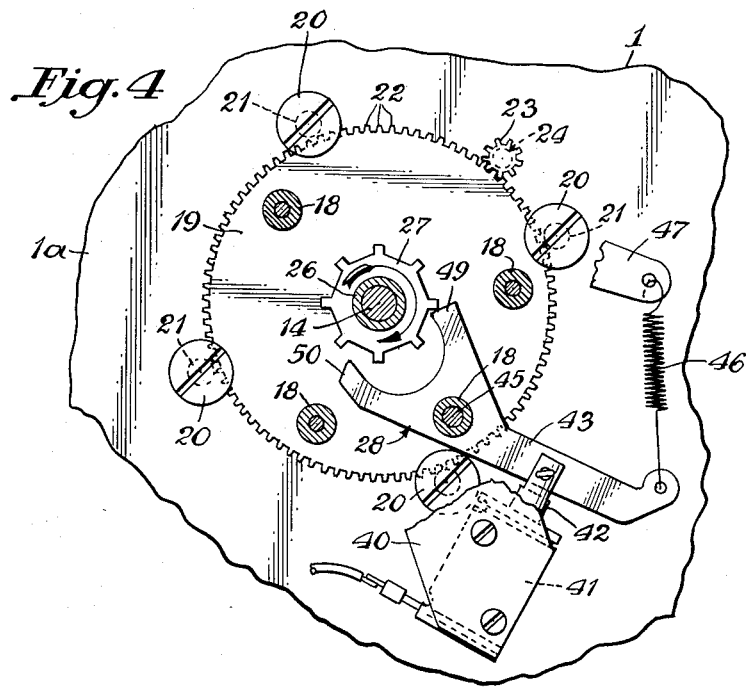
FIG. 4 is a horizontal sectional view along the line 4—4 of FIG. 2.

The lower plate 16 of the framing cage 17 has attached thereto an outwardly extending arm 40 to the outer end of which is secured a solenoid 41 the axially movable armature 42 of which is attached to an arm 43 of the aforesaid escapement lever 28 which at 45 is pivotally mounted on one of the spacing rods 18 of the framing cage 17. The outermost end of the arm 43 is attached to one end of a tension spring 46, the other end of which is attached to a bracket 47 projecting outwardly from the lower plate 16 of the framing cage 17. The spring 46 normally urges the escapement lever 28 into the position shown in FIGS. 3 and 4 in which the tooth 49 of the lever 28 engages a tooth of the ratchet wheel 27 and prevents its rotation. Upon momentary energization of the solenoid 41, however, the armature 42 is attracted momentarily, the tooth 49 of the actuated lever 28 disengages the sprocket 27 and the latter is rotated a partial revolution until the other tooth 50 of the lever 28 engages the ratchet wheel 27 and until the first mentioned tooth 49 upon disenergization of the solenoid 41 again prevents any further rotation of the ratchet wheel 27.

The momentary energization of the solenoid is controlled in any desired manner, for instance by a momentarily closeable switch in the circuit of the solenoid winding or by a signal on a sound tape which would momentarily close the circuit during the operation of the sound tape which may produce the sound accompanying the individual pictures on the film strip when the latter is projected frame by frame by the film strip projecting apparatus of the invention.

What I claim is:

1. In a strip film projection apparatus, a horizontally disposed base plate, a lamp housing and a projection objective mounted on the upper face of said base plate, a first vertical shaft extending with its upper end through said base plate and having a film advancing sprocket fixedly attached to its upper end adjacent said projection objective for advancing said film between said lamp housing and said objective, a film framing cage provided with bearings for said first shaft mounted for rotative adjustment on the lower face of said base plate, manually operable means accessible from the upper side of said base plate and including a pinion on a second vertical shaft for rotatably adjusting said framing cage about the axis of said first shaft, said framing cage including two spaced parallel circular plates and spacer rods therebetween, the upper one of said circular plates having gear teeth on its circumference meshing with said pinion, said first shaft extending through said framing cage and having at its lower end which projects downwardly from the lower one of said circular plates a circular disc fixedly attached thereto, a second circular disc having the form of a belt pulley mounted rotatably and axially slidable on said first shaft and adjacent said first mentioned disc, spring means on said first shaft for urging said rotatable disc in engagement with said first disc and adapted to drive the latter when said rotatable disc is driven, means including an endless belt for continuously driving said second rotatable disc, and an escapement mechanism mounted in said framing cage, said escapement mechanism comprising a ratchet wheel fixedly attached to said first shaft, an escapement lever pivotally mounted on one of said spacer rods, said escapement lever being provided at one end with two teeth for alternately engaging said ratchet wheel for controlling its rotation when said escapement lever is momentarily actuated to permit a rotative movement of said ratchet wheel and therewith a rotative movement of said sprocket which is caused to rotate a predetermined distance under the action of said driven rotatable disc, a solenoid for momentarily actuating said escapement lever, and spring means for returning said escapement lever to a position in which said ratchet wheel is locked against rotation.

2. In a strip film projection apparatus, a horizontally disposed base plate, a lamp housing and a projection objective mounted on the upper face of said base plate, a vertical shaft extending with its upper end through said base plate and having a film advancing sprocket fixedly attached to its upper end adjacent said projection objective, a film framing cage provided with bearings for said shaft mounted for rotative adjustment on the lower face of said base plate, manually operable means accessible from the upper side of said base plate for rotatably adjusting said framing cage about the axis of said shaft, said framing cage including two spaced parallel circular plates and spacer rods therebetween, said shaft extending through said framing cage and having at its lower end which projects downwardly from the lower one of said circular plates a circular disc fixedly attached thereto, a second circular disc having the form of a belt pulley mounted rotatably and axially slidable on said shaft and adjacent said first mentioned disc, spring means on said shaft for urging said second rotatable disc in engagement with said first disc and adapted to drive the latter when said second rotatable disc is driven, means including an endless belt for continuously driving said second rotatable disc, and an escapement mechanism mounted in said framing cage, said escapement mechanism comprising a ratchet wheel fixedly attached to said shaft, an escapement lever pivotally mounted on one of said spacer rods, and engaging said ratchet wheel to prevent its rotation until said escapement lever is momentarily actuated to permit a predetermined rotative movement of said ratchet wheel whereby said sprocket is driven a predetermined distance under the action of said driven rotatable disc, a solenoid on said framing cage adapted when momentarily energized to actuate said escapement lever, and spring means for returning said escapement lever after said momentary energization of said solenoid to its position in which said ratchet wheel is locked against rotation.

References Cited in the file of this patent

UNITED STATES PATENTS

| | | |
|---|---|---|
| 2,017,589 | Dina | Oct. 15, 1935 |
| 2,782,701 | Helber | Feb. 26, 1957 |